United States Patent Office

3,637,766
Patented Jan. 25, 1972

3,637,766
METHOD FOR THE PREPARATION OF (CIS-1,2-EPOXYPROPYL)PHOSPHONIC ACID AND DERIVATIVES THEREOF
Edward J. Glamkowski, 681 E. Front St., and Meyer Sletzinger, 135 Rockview Ave., both of North Plainfield, N.J. 07060
No Drawing. Filed May 15, 1968, Ser. No. 729,446
Int. Cl. C07f 9/38, 9/40
U.S. Cl. 260—348
11 Claims

ABSTRACT OF THE DISCLOSURE

A method for the preparation of (cis-1,2-epoxypropyl) phosphonic acid and the salts and ester derivatives thereof which comprises treating a [(1-haloethoxy)halomethyl]phosphonic acid or a salt or ester thereof with (1) a reagent which releases iodide ion in solution and/or with (2) a metallic coupling agent capable of effecting epoxide-type ring closure. The (cis-1,2-epoxypropyl)phosphonic acid product thus obtained and its salts are antibacterial agents which have utility as antimicrobials in inhibiting the growth of gram-positive and gram-negative pathogenic bacteria.

This invention relates to a novel method for the preparation of (cis-1,2-epoxypropyl)phosphonic acid and the salts and ester derivatives thereof via ring closure of a dihalo substituted ethoxymethylphosphonic acid.

The ± and —(cis-1,2-epoxypropyl)phosphonic acid product of the instant process and its salts are antimicrobial agents which are useful in inhibiting the growth of both gram-positive and gram-negative pathogenic bacteria. The — form, and particularly its salts such as the sodium and calcium salts, are active against Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, ± and —(cis-1,2-epoxypropyl)phosphonic acid and the salts thereof can be used as antiseptic agents to remove susceptible organisms from pharmaceutical, dental and medical equipment and can also be used in other areas subject to infection by such organisms. Similarly, they can be used to separate certain microorganisms from mixtures of microorganisms. The salts of —(cis-1,2-epoxypropyl)phosphonic acid are particularly valuable because not only do they have application in the treatment of diseases caused by bacterial infections, but they are active against resistant strains of pathogens. The said salts constitute a preferred embodiment of this invention because they are effective when given orally although it is to be noted that they can also be administered parenterally.

In accordance with this invention (cis-1,2-epoxypropyl) phosphonic acid and its salts and ester derivatives (I, infra) are obtained by treating a [(1-haloethoxy)halomethyl]phosphonic acid or a salt or ester derivative thereof (II, infra) with (1) a reagent which releases iodide ion in solution such as potassium iodide, etc. or with (2) a metallic coupling agent capable of effecting an epoxide-type ring closure and selected from among the metals described in Groups Ia, IIa, Ib or IIb of the Periodic Table. Typical of such metallic reagents are, for example, the elemental metals such as lithium, sodium, magnesium and combinations of metals such as zinc-copper complexes, etc.; however, if a phosphonic acid reactant and an ionizable metal such as lithium, sodium, magnesium, etc. are employed the process will usually yield the corresponding metal salt of the phosphonic acid product (I) which, if desired, may be converted to the free acid by passing an aqueous solution of the salt through a cation-exchange column on the hydrogen cycle. On the other hand, if a phosphonic acid reactant and zinc-copper couple or other similarly non-ionizable reagent is used then the product obtained is the free phosphonic acid. The following equation illustrates this method of preparation:

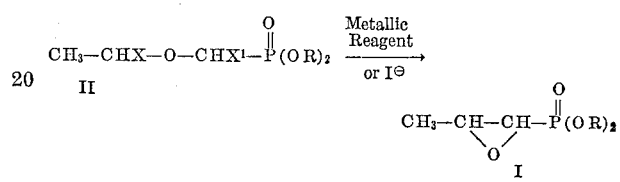

wherein R is hydrogen, alkyl, for example, lower alkyl such as methyl, ethyl, propyl, isopropyl, n-butyl, n-amyl, etc., lower alkenyl such as allyl, etc., aryl such as phenyl, naphthyl, etc., aralkyl such as benzyl, phenethyl, menaphthyl, etc., the cation derived from an alkali metal or alkaline earth metal such as the cation derived from sodium, lithium, magnesium or calcium metal, etc., and, when R is hydrogen, amine salts of the resulting acid as, for example, amine salts derived from benzylamine, α-phenethylamine, quinine, brucine, lysine, protamine, arginine, procaine, ethanol-amine, morphine, ethylenediamine, N,N'-dibenzylethylene-diamine, glycine, and such biologically active amides as tetracycline and novobiocin, X and $X^1$ are halo, such as chloro, bromo, fluoro, etc. and the Metallic Reagent is a metal or combination of metals selected from Groups Ia, IIa, Ib or IIb of the Periodic Table. When R in the above equation represents a radical other than hydrogen, then the resulting salt or (cis-1,2-epoxypropyl)phosphonic acid ester can either be isolated per se as a product of the invention or the said salt or ester derivative can be converted to the (cis-1,2-epoxypropyl)phosphonic acid by a variety of means as, for example, by treatment with an aqueous solution of a suitable acid such as hydrochloric acid or sulfuric acid under carefully buffered conditions. Also, in addition to hydrolytic methods, the esterified products may be converted to the corresponding acid by enzymolysis, by hydrogenation in the presence of a suitable catalyst such as Raney nickel and the like, by subjecting the said ester derivative to ultraviolet irradiation or by treatment with a suitable reagent such as trimethylchlorosilane followed by aqueous hydrolysis.

The application of heat and the choice of a suitable solvent are not critical aspects of the invention and, in general, the reaction may be conducted at temperatures in the range of from about ambient temperature up to the boiling point of the reaction medium. However, a preferred embodiment of this invention consists in heating the reactants within a range beginning at the reflux temperature of the reaction mixture up to about 100° C. Also, when the ring closing agent employed is a metallic reagent, it is desirable to employ temperatures in the range of from about 30–60° C. and to conduct the reaction in the presence of crystalline iodine. The iodine promotes the reaction of the [(1-haloethoxy)halomethyl]phosphonic acid reactant with the metallic reagent and, therefore, functions as a catalyst in the process. However, the iodine is not essential to the success of the reaction. The reaction may also be conducted in an inert atmosphere as, for example, in nitrogen or argon but such an expedient is purely optional and has practical application primarily when the ring closing agent is one of the metallic reagents mentioned above.

Any solvent in which the reactants are reasonably soluble may be employed; however, ether solvents such as tetrahydrofuran, ethyl ether, dioxane, 1,2-dimethoxyethane and the like have proved to be particularly suitable media in which to conduct the reaction and, therefore, constitute the solvents of choice in this process. It is only necessary to dissolve or suspend the [(1-haloethoxy)halomethyl] phosphonic acid or a salt or ester derivative thereof (II) in the solvent and then add the reagent necessary to effect ring closure.

The nuclear carbons comprising the epoxide ring in the instant products (I) are asymmetric in character and, therefore, the said products (I) may be obtained either as a racemic mixture or in the form of one or more of their four optically active isomers. Since the process proceeds via a displacement of the X and $X^1$ substituents in the n-propylphosphonic acid molecule (II, infra) the synthesis may result in either a retention or an inversion of the starting material configuration at each of the asymmetric carbons (carbons 1 and 2):

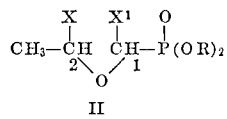

II

As a general rule, formation of the epoxide product takes place with retention of the absolute configuration at the 1-carbon and inversion at the 2-carbon. In principle, therefore, it is possible to effect the synthesis of any particular optically active product by simply selecting as the reactant in the process the appropriate optically active starting material. In terms of the Cahn-Ingold-Prelog convention, when optically active 1R:2S (cis-1,2-epoxypropyl)phosphonic acid is desired, it is only necessary to select as the starting material the corresponding 1R:2S (1-haloethoxy) halomethyl phosphonic acid precursor wherein the halo moieties are chloro, bromo, or iodo; however, when the starting material is the corresponding [(1-fluoroethoxy) fluoromethyl]phosphonic acid reactant it is necessary to employ the corresponding 1S:2S isomer. In this connection it should be noted that —(cis-1,2-epoxypropyl)phosphonic acid and its salts are particularly effective in inhibiting pathogenic bacteria and, therefore, the preparation of that particular isomer constitutes a preferred embodiment of this invention.

The [(1-haloethoxy)halomethyl]phosphonic acid, its salts and [(1-haloethoxy)halomethyl]phosphonic acid esters (II) employed as starting materials in the process of this invention are conveniently obtained by treating hydroxymethylphosphonic acid or its salt or a suitable esterified derivative thereof (IV, infra) with acetaldehyde in the presence of a gaseous hydrogen halide such as hydrogen chloride, hydrogen bromide, hydrogen fluoride, etc., to yield the corresponding (1-haloethoxy)methylphosphonic acid or its salt or (1-haloethoxy)methylphosphonic acid ester (III, infra) and the intermediate thus obtained is then subjected to free radical halogenation as, for example, by treatment with tert.-butyl hypohalite such as tert.-butyl hypochlorite, tert.-butyl hypobromide, etc. and with an azo bis-isobutyronitrile initiator. The following equation illustrates this method of preparation:

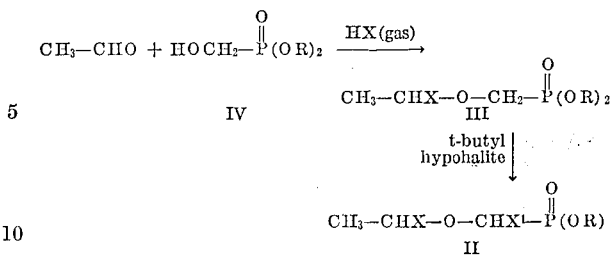

wherein R, X and $X^1$ are as defined above. The [(1-haloethoxy)halomethyl]phosphonic acid or phosphonate (II) thus obtained is usually isolated in the form of an oil and is of sufficient purity as to be useable directly as the starting material in the process of this invention.

The hydromethylphosphonic acid diesters (IV) employed as reactants in the foregoing synthesis are either known compounds or can be obtained by methods well known to those skilled in the art. Thus, for example, the said diesters may be obtained simply by treating a suitably esterified phosphonic acid (V, infra) with a slight excess of formaldehyde followed by distillation of the reaction mixture to yield the corresponding hydroxymethylphosphonic acid diester (IV):

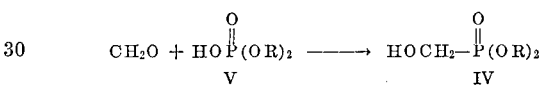

wherein R is as defined above.

The following examples illustrate the method by which (cis-1,2-epoxypropyl)phosphonic acid and its salts and ester derivatives (I) may be obtained. However, the examples are illustrative only and should not be construed as being limited thereto since other functionally equivalent reagents may be substituted for the hydroxymethylphosphonic acid or hydroxymethylphosphonate and metallic coupling agents recited therein to yield an identical (cis-1,2-epoxypropyl)-phosphonic acid product and its corresponding salts and ester derivatives. The —(cis-1,2 - epoxypropyl)phosphonic acid referred to herein rotates plane-polarized light in a counter clockwise direction (to the left as viewed by the observer) when the rotation of its disodium salt is measured in water (5% concentration) at 405 mμ.

The designation cis used in describing the 1,2-epoxypropylphosphonic acid compounds means that each of the hydrogen atoms attached to carbon atoms 1 and 2 of the propyl phosphonic acid are on the same side of the oxide ring.

EXAMPLE 1

(Cis-1,2-epoxypropyl)phosphonic acid

Step A: [(1-chloroethoxy)chloromethyl]phosphonic acid.—Acetaldehyde (1.1 mole) and hydroxymethylphosphonic acid (1 mole) in 500 ml. of benzene are saturated with hydrogen chloride gas at 10–15° C. The mixture is aged at 25° C. for 24 hours, the solvent distilled out in vacuo and the residue flushed three times with benzene to remove all traces of hydrogen chloride. The residue is taken up in benzene (500 ml.), treated with tert.-butyl hypochlorite (0.8 mole) and azo bis-isobutyronitrile (0.8 mm.) at 40° C. until titration shows the absence of hypochlorite and the solution is then evaporated to yield [(1-chloroethoxy)-chloromethyl] phosphonic acid in the form of an oil.

Step B: (Cis-1,2-epoxypropyl)phosphonic acid.—[(1-chloroethoxy)chloromethyl]phosphonic acid (1.0 g.) is added with stirring to tetrahydrofuran (50 ml.) to which has been added a crystal of iodine and a zinc-copper couple (15.0 g.). The mixture then is heated under reflux for 24 hours and the resulting solution filtered to yield (cis-1,2-epoxypropyl)phosphonic acid.

EXAMPLE 2

(Cis-1,2-epoxypropyl)phosphonic acid and magnesium salt

Step A: Magnesium (cis-1,2-epoxypropyl)phosphonic acid.—[(1 - chloroethoxy)chloromethyl]phosphonic acid (1.0 g.) is added with stirring to tetrahydrofuran (50 ml.) to which has been added a crystal of iodine and finely divided magnesium (10.0 g.). The mixture is then heated under reflux for 24 hours and the resulting solution filtered to yield the magnesium salt of (cis-1,2-epoxypropyl)phosphonic acid.

Step B: (Cis-1,2-epoxypropyl)phosphonic acid.—The magnesium salt of (cis-1,2-epoxypropyl)phosphonic acid obtained according to Step A is evaporated in vacuo, taken up in 20 ml. of water and passed through a column containing 25 g. of an ion-exchange resin (Amberlite I.R. 120 resin) on the hydrogen cycle. Elution with 20 ml. of water yields free (cis-1,2-epoxypropyl)phosphonic acid.

EXAMPLE 3

(Cis-1,2-epoxypropyl)phosphonic acid and dilithium salt

Step A: Dilithium salt of (cis-1,2-epoxypropyl)phosphonic acid. — [(1 - chloroethoxy)chloromethyl]phosphonic acid (1.0 g.) is added with stirring to tetrahydrofuran (50 ml.) to which has been added a crystal of iodine and finely divided lithium (10.0 g.). The mixture is then heated under reflux for 24 hours and the resulting solution filtered to yield the dilithium salt of (cis-1,2-epoxypropyl)phosphonic acid.

Step B: (Cis-1,2-epoxypropyl)phosphonic acid.—The dilithium salt of (cis-1,2-epoxypropyl)phosphonic acid obtained according to Step A is evaporated in vacuo, taken up in 20 ml. of water and passed through a column containing 25 g. of an ion-exchange resin (Amberlite I.R. 120 resin) on the hydrogen cycle. Elution with 20 ml. of water yields free (cis-1,2-epoxypropyl)phosphonic acid.

EXAMPLE 4

(Cis-1,2-epoxypropyl)phosphonic acid and diethyl ester

Step A: Diethyl hydroxymethylphosphonate.—Diethylphosphite (10.0 g.) and a slight molar excess of formaldehyde are mixed together and the temperature of the reaction mixture is maintained at 5° C. for three hours. The mixture is then distilled in vacuo to yield a distillate identified as diethyl hydroxymethylphosphonate, B.P. 103–105° C./0.2 mm.

Step B: Diethyl [(1-chloroethoxy)chloromethyl]phosphonate.—Acetaldehyde (1.1 mole) and diethyl hydroxymethylphosphonate (1 mole) in 500 ml. of benzene are saturated with hydrogen chloride gas at 10–15° C. The mixture is aged at 25° C. for 24 hours, stripped in vacuo and flushed three times with benzene. The residue is taken up in benzene (500 ml.) and is treated with tert.-butyl hypochlorite (0.8 mole) and then with azo bis-isobutyronitrile (0.8 mm.) at 40° C. until titration shows the absence of hypochlorite and the solution is evaporated to yield diethyl [(1-chloroethoxy)chloromethyl]phosphonate in the form of an oil.

Step C: Diethyl (cis-1,2-epoxypropyl)phosphonate.—Diethyl [(1-chloroethoxy)chloromethyl]phosphonate (1.0 g.) is added with stirring to tetrahydrofuran (50 ml.) to which has been added a crystal of iodine and a zinc-copper couple (15.0 g.). The mixture is then heated under reflux for 24 hours and the resulting solution filtered to yield diethyl (cis-1,2-epoxypropyl)phosphonate.

Step D: (Cis-1,2-epoxypropyl)phosphonic acid and disodium salt.—Diethyl (cis-1,2-epoxypropyl)phosphonate (1 mmole) in trimethylchlorosilane (10 cc.) is refluxed for eight hours and the reaction mixture is treated with water to yield an aqueous solution of (cis-1,2-epoxypropyl)phosphonic acid. The product thus obtained is then treated with two equivalents of sodium hydroxide and the solution evaporated to yield disodium (cis-1,2-epoxypropyl)phosphonate.

EXAMPLE 5

Dipotassium (cis-1,2-epoxypropyl)phosphonate

[(1-chloroethoxy)chloromethyl]phosphonic acid (1.0 g.) is stirred in dry acetone (500 ml.) with two equivalents of potassium iodide and excess potassium carbonate for several hours at room temperature. The solution is filtered, evaporated in vacuo and treated with water. The aqueous solution is then filtered and evaporated in vacuo to yield a residue identified as dipotassium (cis-1,2-epoxypropyl)phosphonate.

EXAMPLE 6

(Cis-1,2-epoxypropyl)phosphonic acid and disodium salt

Step A: Disodium salt of (cis-1,2-epoxypropyl)phosphonic acid.—A solution of disodium [(1-chloroethoxy)chloromethyl]phosphonic acid, obtained by the reaction of [(1-chloroethoxy)chloromethyl]phosphonic acid with two equivalents of sodium hydride in tetrahydrofuran, is treated with two equivalents of potassium iodide and excess potassium carbonate. The reaction mixture is allowed to stand at room temperature for several hours and then filtered, evaporated and treated with water. The aqueous solution is then filtered and evaporated in vacuo to yield the disodium salt of (cis-1,2-epoxypropyl)phosphonic acid.

Step B: (Cis-1,2-epoxypropyl)phosphonic acid.—The disodium salt of (cis-1,2-epoxypropyl)phosphonic acid obtained according to Step A is taken up in 20 ml. of water and passed through a column containing 25 g. of an ion-exchange resin (Amberlite I.R. 120 resin) on the hydrogen cycle. Elution with 20 ml. of water yields free (cis-1,2-epoxypropyl)phosphonic acid.

EXAMPLE 7

—(Cis-1,2-epoxypropyl)phosphonic acid and disodium salt

Step A: 1R:2S [(1-chloroethoxy)chloromethyl]phosphonic acid.—[(1-chloroethoxy)chloromethyl]phosphonic acid (10.0 g.) is treated with 1 equivalent of sodium hydride at 15° C. in dioxane to yield a mixture (i.e., the 1R:2S/1S:2R and 1R:2R/1S:2S mixtures) of monosodium [(1-chloroethoxy)chloromethyl]phosphonates. The mixture thus obtained is then subjected to fractional crystallization to afford a 1R:2S/1S:2R racemic mixture of monosodium [(1 - chloroethoxy)chloromethyl]phosphonate and the said mixture is then treated with exactly one equivalent of strychnine hydrochloride in 10 volumes of tetrahydrofuran. The mixture is filtered to separate out sodium chloride and the volume of tetrahydrofuran is then reduced by evaporation until crystallization begins. The two enantiomeric forms (i.e., the 1R:2S and 1S:2R forms) of the strychnine salt of monosodium [(1-chloroethoxy)chloromethyl]phosphonate thus obtained are then separated by crystallization of their strychnine salts from tetrahydrofuran and the desired 1R:2S form of monosodium [(1-chloroethoxy)chloromethyl]phosphonate is regenerated from its salt by treatment with one equivalent of dry hydrogen chloride gas in a mixture of ether and benzene. Upon filtration of the strychnine hydrochloride, the solvent is removed in vacuo to yield the desired 1R:2S [(1-chloroethoxy)chloromethyl]phosphonic acid.

Step B: 1R:2S dimethyl [(1-chloroethoxy)chloromethyl]phosphonate.—1R:2S [(1-chloroethoxy)chloromethyl]phosphonic acid (1.0 g.) is stirred with 10 ml. of benzene at 25° C. and two equivalents each of pyridine and thionyl chloride are added. After 30 minutes pyridine hydrochloride is filtered off and washed twice with benzene (1 ml.). The filtrate is evaporated in vacuo below 20° C. to remove unreacted thionyl chloride and the residue is taken up in benzene (10 ml.) and treated with two equivalents each of pyridine and methanol while maintaining the temperature at approximately 20° C. Upon filtration of the pyridine hydrochloride the filtrate is evaporated in vacuo to yield 1R:2S dimethyl [(1-chloroethoxy)chloromethyl]phosphonate.

Step C: Dimethyl —(cis-1,2-epoxypropyl)phosphonate.—1R:2S Dimethyl [(1-chloroethoxy)chloromethyl]-phosphonate (1.0 g.) is added with stirring to tetrahydrofuran (50 ml.) to which has been added a crystal of iodine and a zinc-copper couple (15.0 g.). The mixture is then heated under reflux for 24 hours and the resulting solution filtered to yield dimethyl —(cis-1,2-epoxypropyl)-phosphonate.

Step D: —(Cis-1,2-epoxypropyl)phosphonic acid and disodium salt.—By substituting —dimethyl (cis-1,2,-epoxypropyl)phosphonate for the diethyl (cis-1,2-epoxypropyl)phosphonate recited in Example 4, Step D and following the procedure described therein the products —(cis-1,2-epoxypropyl)phosphonic acid and the disodium salt thereof, respectively, are obtained.

The (cis-1,2-epoxypropyl)phosphonic acid product of this invention and its salts and ester derivatives may also be prepared by substituting other metallic reagents and other dialkylphosphites for the magnesium, lithium and zinc-copper couple and diethylphosphite reactants disclosed in the foregoing examples. The following equation illustrates the reaction of Example 4, Steps A–D, and, together with Table I (infra), indicates the various metallic reagents and several varieties of phosphites which may be employed as starting materials according to the process of this invention to yield the desired (cis-1,2-epoxypropyl)phosphonic acid product and its corresponding salts and ester derivatives:

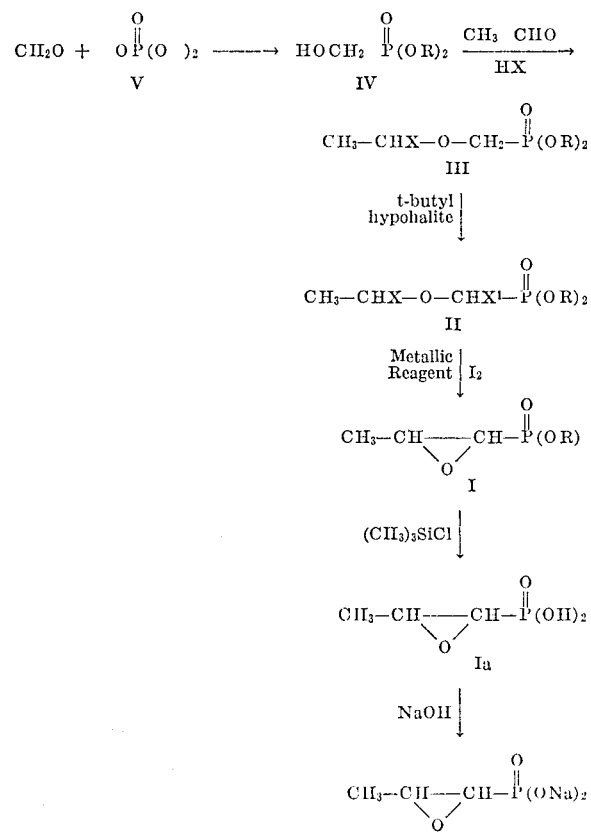

TABLE I

| Example | R | X | X¹ | Metallic reagent |
|---|---|---|---|---|
| 8 | $-(CH_2)_2-CH_3$ | Br | Br | Li |
| 9 | 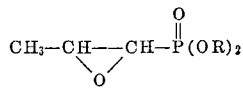 | Cl | Cl | Mg |
| 10 | $-C_2H_5$ | F | F | Zn-Cu |
| 11 | $-(CH_2)_4CH_3$ | Br | Cl | Na |
| 12 | 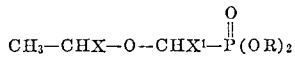 | Cl | F | Ca |
| 13 | $-CH_2-CH=CH_2$ | Cl | Cl | Li |

It will be apparent from the foregoing that the instant process constitutes a new and effective method for the preparation of (cis-1,2-epoxypropyl)phosphonic acid and its salt and ester derivatives; and it should also be apparent to those skilled in the art that the processes disclosed in the above examples are merely illustratve and are capable of wide variation and modification without departing from the spirit of this invention.

What is claimed is:

1. A method for the preparation of a compound having the formula:

$$CH_3-CH\underset{O}{-\!\!-\!\!-}CH-\overset{O}{\overset{\|}{P}}(OR)_2$$

wherein R is hydrogen, alkyl, lower alkenyl, aryl, aralkyl, the cation derived from an alkali metal or alkaline earth metal and, when R is hydrogen, amine salts of the resulting acid; which comprises treating a compound having the formula:

$$CH_3-CHX-O-CHX^1-\overset{O}{\overset{\|}{P}}(OR)_2$$

wherein X and X¹ are halo and R is as defined above; with potassium iodide or with a metallic coupling agent selected from lithium, sodium, magnesium and a zinc-copper couple in the presence of a catalytic amount of crystalline iodine.

2. A method according to claim 1 for the preparation of the disodium salt of —(cis-1,2-epoxypropyl)phosphonic acid which comprises treating 1R:2S di-lower alkyl [(1-haloethoxy)halomethyl]phosphonate with a zinc-copper couple in the presence of a catalytic amount of crystalline iodine followed by the conversion of the di-lower alkyl (cis-1,2-epoxypropyl)phosphonate thus obtained to the desired product by treatment with trimethylchlorosilane and then with an aqueous solution of sodium hydroxide.

3. The process of claim 1 wherein R is hydrogen and ring closure is effected in the presence of a catalytic amount of crystalline iodine and a metallic coupling agent selected from among lithium, sodium, magnesium and a zinc-copper couple.

4. The process of claim 1 wherein R is hydrogen and ring closure is effected in the presence of potassium iodide.

5. The process of claim 3 wherein the metallic reagent is a zinc-copper couple.

6. The process of claim 3 wherein the metallic reagent is a magnesium metal.

7. The process of claim 3 wherein the metallic reagent is lithium metal.

8. The process of claim 1 wherein R is alkyl, lower alkenyl, aryl, aralkyl or the cation derived from an alkali metal or alkaline earth metal and ring closure is effected in the presence of a catalytic amount of crystalline iodine and a metallic coupling agent selected from among lithium, sodium, magnesium and a zinc-copper couple.

9. The process of claim 8 wherein ring closure is effected in the presence of a zinc-copper couple.

10. The process of claim 8 wherein the (cis-1,2-epoxypropyl)phosphonic acid ester thus obtained is converted to the free acid by treatment with trimethylchlorosilane, followed by aqueous hydrolysis.

11. The process of claim 1 wherein R is the cation derived from an alkali metal or alkaline earth metal and ring closure is effected in the presence of potassium iodide.

References Cited

FOREIGN PATENTS 435,110   9/1935   Great Britain.

OTHER REFERENCES

Houben-Weyl, Methoden der Organischen Chemie, vol. 12/1 (1963), pp. 352–4, 3833–4, 409–12.

Fieser and Fieser, Reagents for Organic Synthesis (1967), pp. 1292–3.

Banthorpe, D. V., Elimination Reactions (1963), pp. 140–2.

NORMA S. MILESTONE, Primary Examiner

U.S. Cl. X.R.

260—950, 502.4 R; 424—203